United States Patent
Volkl et al.

(10) Patent No.: US 12,268,564 B2
(45) Date of Patent: Apr. 8, 2025

(54) BLANKS AND METHODS FOR THE MANUFACTURE OF AT LEAST ONE MOLDED BLANK

(71) Applicant: DENTSPLY SIRONA Inc., York, PA (US)

(72) Inventors: Lothar Volkl, Goldbach (DE); Stefan Fecher, Johannesberg (DE); Andreas Gebhardt, Langenselbold (DE)

(73) Assignee: Dentsply Sirona Inc., York, PA (US)

( * ) Notice: Subject to any disclaimer, the term of this patent is extended or adjusted under 35 U.S.C. 154(b) by 0 days.

(21) Appl. No.: 15/701,522

(22) Filed: Sep. 12, 2017

(65) Prior Publication Data

US 2019/0076222 A1    Mar. 14, 2019

(51) Int. Cl.
| | | |
|---|---|---|
| A61C 13/08 | (2006.01) | |
| A61C 13/00 | (2006.01) | |
| A61C 13/083 | (2006.01) | |
| A61C 13/087 | (2006.01) | |
| A61C 13/09 | (2006.01) | |
| A61C 13/20 | (2006.01) | |
| C04B 35/488 | (2006.01) | |

(52) U.S. Cl.
CPC ........ *A61C 13/081* (2013.01); *A61C 13/0003* (2013.01); *A61C 13/0022* (2013.01); *A61C 13/206* (2013.01); *C04B 35/488* (2013.01); *A61C 13/083* (2013.01); *A61C 13/087* (2013.01); *A61C 13/09* (2013.01); *C04B 2235/3463* (2013.01); *C04B 2237/348* (2013.01); *C04B 2237/405* (2013.01)

(58) Field of Classification Search
CPC .............. A61C 13/081; A61C 13/0022; A61C 13/0003; A61C 13/206; A61C 13/09; A61C 13/087; A61C 13/083; C04B 35/488; C04B 2237/348; C04B 2235/3463; C04B 2237/405
See application file for complete search history.

(56) References Cited

U.S. PATENT DOCUMENTS 5,080,589 A * 1/1992 Oden ..................... A61K 6/836
433/202.1
6,345,984 B2 * 2/2002 Karmaker .......... A61C 13/0022
D24/152
(Continued)

FOREIGN PATENT DOCUMENTS

| CN | 105283148 A * | 1/2016 | ......... A61C 13/0022 |
| DE | 102011055393 A1 | 5/2013 | |

(Continued)

OTHER PUBLICATIONS

CN-105283148-A translation (Year: 2023).*

(Continued)

*Primary Examiner* — Jeffrey M Wollschlager
*Assistant Examiner* — Guy F Mongelli
(74) *Attorney, Agent, or Firm* — SCHWEGMAN LUNDBERG & WOESSNER, P.A.

(57) ABSTRACT

The invention relates to a blank for the production of a molded body, in particular a dental reconstruction. The blank has a base and at least one region that emanates therefrom and projects above the base, from which at least a part of the molded body can be derived by working.

21 Claims, 5 Drawing Sheets

SECTION D-D

(56) References Cited

U.S. PATENT DOCUMENTS

| | | | |
|---|---|---|---|
| 6,846,181 B2* | 1/2005 | Karmaker | A61C 5/30 433/212.1 |
| 7,856,286 B2* | 12/2010 | Kraemer | A61C 13/0004 700/98 |
| 10,441,391 B2* | 10/2019 | Volkl | A61C 13/0022 |
| 10,531,938 B2* | 1/2020 | Vollmann | A61C 13/081 |
| 11,090,142 B2* | 8/2021 | Volkl | A61C 13/082 |
| 2001/0036617 A1* | 11/2001 | Karmaker | A61C 13/0022 433/172 |
| 2003/0031984 A1 | 2/2003 | Rusin | |
| 2003/0073563 A1* | 4/2003 | Brodkin | C03C 4/0021 106/35 |
| 2004/0146833 A1* | 7/2004 | Dyer | A61C 13/04 433/199.1 |
| 2004/0197729 A1* | 10/2004 | Honstein | A61C 9/002 433/34 |
| 2005/0186540 A1* | 8/2005 | Taub | A61C 13/0006 433/223 |
| 2006/0257824 A1* | 11/2006 | Pfeiffer | A61C 13/0022 433/223 |
| 2008/0034614 A1* | 2/2008 | Fox | A43B 17/026 36/43 |
| 2008/0208351 A1* | 8/2008 | Besenbacher | G01N 33/543 623/23.5 |
| 2008/0254414 A1* | 10/2008 | McGuire | A61C 13/0022 433/223 |
| 2009/0023112 A1* | 1/2009 | Ganley | A61C 13/0022 433/215 |
| 2009/0291414 A1* | 11/2009 | Wang | A61C 1/084 433/174 |
| 2010/0248189 A1* | 9/2010 | Burger | A61C 13/083 433/203.1 |
| 2011/0081830 A1* | 4/2011 | Pollasky | A61C 3/06 451/28 |
| 2012/0114516 A1* | 5/2012 | Hachenberg | B22F 3/24 419/25 |
| 2013/0059272 A1* | 3/2013 | Jahns | A61K 6/78 433/199.1 |
| 2013/0171410 A1* | 7/2013 | Armbruster | A61L 27/18 428/132 |
| 2013/0221554 A1* | 8/2013 | Jung | A61C 13/0022 264/16 |
| 2013/0277874 A1* | 10/2013 | Johnson | A61C 13/0022 264/16 |
| 2013/0309035 A1* | 11/2013 | Guy | B23B 31/202 409/234 |
| 2014/0212845 A1* | 7/2014 | Wadhwani | A61C 13/08 433/173 |
| 2014/0300014 A1* | 10/2014 | Tanaka | A61C 13/082 264/20 |
| 2015/0037757 A1* | 2/2015 | Kwan | A61C 13/0004 433/174 |
| 2015/0066181 A1* | 3/2015 | Beyer | A61C 13/0004 700/98 |
| 2015/0366641 A1* | 12/2015 | Malinin | A61C 8/0012 433/163 |
| 2016/0113845 A1* | 4/2016 | Fecher | C03B 19/06 501/32 |
| 2017/0027672 A1* | 2/2017 | Savic | A61C 13/0006 |
| 2017/0181818 A1* | 6/2017 | Volkl | B28B 11/243 |
| 2017/0189143 A1* | 7/2017 | Wolz | C04B 41/009 |
| 2017/0189146 A1* | 7/2017 | Volkl | A61C 5/77 |
| 2017/0202651 A1* | 7/2017 | Renz | A61C 13/081 |
| 2017/0231730 A1* | 8/2017 | Shen | A61C 13/34 433/201.1 |
| 2017/0273764 A1* | 9/2017 | Volkl | A61C 13/09 |
| 2018/0104031 A1* | 4/2018 | Vollmann | C03C 3/097 |
| 2018/0279606 A1* | 10/2018 | Yamashita | A01N 25/34 |
| 2019/0076222 A1 | 3/2019 | Volkl | |

FOREIGN PATENT DOCUMENTS

| | | | | |
|---|---|---|---|---|
| EP | 0807422 A1 | | 11/1997 | |
| EP | 2016922 A2 | | 1/2009 | |
| JP | 2011041809 A | * | 3/2011 | A61C 13/0022 |
| WO | WO-2004058087 A2 | * | 7/2004 | A61C 13/0006 |
| WO | 2013167903 A1 | | 11/2013 | |

OTHER PUBLICATIONS

International Search Report; PCT/EP2017/072845; Apr. 30, 2018 (completed); May 14, 2018 (mailed).

Written Opinion of the International Searching Authority; PCT/EP2017/072845; Apr. 30, 2018 (completed); May 14, 2018 (mailed).

International Preliminary Report on Patentability; PCT/EP2017/072845; Apr. 30, 2018 (completed); May 14, 2018 (mailed).

"Proposed American National Standard/American Dental Association Standard No. 187 for Dentistry—Dental CAD/CAM Machinable Ceramic Blanks"; American Dental Association, Standards Committee on Dental Products, 2023.

* cited by examiner

SECTION D-D

SECTION A-A

SECTION A-A

BLANKS AND METHODS FOR THE MANUFACTURE OF AT LEAST ONE MOLDED BLANK

TECHNICAL FIELD

The invention relates to a blank for the manufacture of at least one molded body, in particular a dental reconstruction.

The invention also embraces a method for the production of at least one molded part, in particular a dental restoration, or a section thereof through material-removing processing.

BACKGROUND OF THE INVENTION

Blanks, made of ceramic materials have been successfully applied for manufacturing molded bodies, in particular dental restorations through material-removing machining using multi-axis machine tools such as milling machines. Blanks consisting of other materials, such as plastics, composites or metals, are also used for that purpose.

To produce high-precision molded parts by CAD/CAM methods it is necessary to take the wear of the machining tool into consideration. In the prior art blanks are machined in such a way that the tool is fed in an axial direction. This results in a high load on the tool and thus to wear, which means that it is necessary to change the tool frequently.

SUMMARY OF THE INVENTION

An object of the present invention is to provide a blank that allows the wear on the tool to be reduced when the blank is machined. A further object is to enable optimal usage of the material considering the shape of the desired molded part.

Moreover, a method for the production of a molded body is presented which is characterized by a reduction in the wear of the tool.

To achieve the aim a blank is proposed which consists essentially of a base and at least one region that emanates therefrom and projects above the base, from which the molded body or at least a part of it can be obtained. Preferably the blank comprises a plurality of regions projecting either above one side of the base or above both sides of the base.

In contrast to the prior art, the blank does not have a disc geometry or cuboid geometry with uniform thickness that does not vary, but rather comprises a carrier layer that forms the base and regions that emanate and project therefrom, to yield the advantage that the material requirement for the blank is reduced so that molded parts can be produced at lower cost, in particular dental reconstructions such as bridges, frameworks, crowns, caps, veneers, inlays or onlays.

In addition to material savings there is further the advantage that right from the start of the machining operation regions can be machined from their sides, i.e., relative movement in a transverse direction between the tool's axis of rotation and the projecting region, in particular perpendicular to the axis of rotation, is possible. This results in a lower load on the tool so that wear is reduced.

The at least one region projecting above the base has preferably one of the following geometries—cuboid, cylindrical, conical or curved shape. The different geometries enable an optimal adaptation to the shape or geometries of the molded bodies to be produced. Thus for the production of dental reconstructions regions can project from the base that are different in terms of area to such an extent that from a single blank, molded bodies of different geometries can be derived through material-removing working, with optimal material usage.

In particular it is provided for the base to have a thickness B where B≤10 mm, preferably B≤5 mm, in particular 1.5 mm≤B≤4 mm.

In a further development of the invention the ratio of the thickness B of the base to the thickness H of the region projecting above the base is 1:15–B:H≤1:1, in particular 1:10≤B:H≤1:6.

In terms of area the regions have dimensions that enable the production of a dental framework, a crown, a partial crown, a bridge, a dental arch, a cap, a veneer, an abutment, a pin construction, an inlay and/or an onlay.

In a preferred embodiment the blank or at least a region of it comprises or contains at least one material from the group of ceramic materials such as zirconium dioxide, glass ceramic, feldspar ceramic, metallic materials such as titanium, CoCr alloy, organic materials such as thermoplastic material, in particular PMMA or PEEK, composite materials, glass fiber-reinforced plastic.

The blank is preferably made from zirconium dioxide to which yttrium oxide ($Y_2O_3$), calcium oxide (CaO), magnesium oxide (MgO) and/or cerium oxide ($CeO_2$), in particular yttrium oxide, has been added.

Further, there is the possibility of producing dental prostheses in particular which in terms of color gradation, or in terms of their material properties, correspond to a natural tooth. The invention is therefore characterized in that the at least one region projecting above the base, optionally incorporating the materials of the base, comprises sections that differ in terms of their material properties, such as strength and/or translucency and/or coloration and/or fluorescence.

There is no departure from the invention if the base is made from a material that is different from that of the regions from which the molded bodies are derived. So, for example, the base material may be a plastic. The base can have openings in which the regions, for instance, are glued in. However, there is also the possibility that the regions are surrounded by the base material during manufacturing of the base by e.g. injection molding. Corresponding to the thickness of the base the regions are lamellar enclosed by the base material.

The invention relates also to a method for the production of at least one molded body, in particular a dental restoration, or a section thereof through machining by material-removing from a region of a blank that projects from a base, wherein the machining commences through removal of material from the circumferential surface of the region.

It is thereby in particular provided for the machining to be carried out using a milling tool that has an axis of rotation and that at least at the beginning of material removal there is a relative movement between the milling tool and the region transverse, preferably perpendicular, to the axis of rotation.

The blank itself can be produced through pressing, casting, additive methods, forming or mechanical working methods.

Particularly, use is made of a blank with a base from which a number of regions emanate, wherein the regions are separated by a section of the base.

Further details, advantages and features of the invention may be derived not only from the claims, and the features to be taken from them—either alone and/or in combination—but also from the examples described below and illustrated by drawings.

BRIEF DESCRIPTION OF THE DRAWINGS

Figures.

DETAILED DESCRIPTION OF THE INVENTION

The teaching according to the invention is described in more detail with reference to the figures, on the basis of which molded bodies, in particular dental molded parts, can be produced in a material-saving manner from blanks, in particular through milling. At the same time this yields the advantage that the wear on the tool used for machining of the blank can be reduced.

The blanks can preferably comprise ceramic materials such as zirconium dioxide, glass ceramic, feldspar ceramic, to name just a few ceramic materials.

The blanks may in particular be of zirconium dioxide to which yttrium oxide, calcium oxide, magnesium oxide and/or cerium oxide is added, but in particular yttrium oxide stabilized zirconia.

Suitable materials also include metallic materials such as titanium or CoCr alloys.

The blanks may also be made from organic materials, optionally filled, in particular thermoplastic materials such as polymethylmethacrylate (PMMA) or polyetheretherketone (PEEK).

Composite materials or glass fiber-reinforced plastic are also possible.

Disc-shaped blanks are generally used to manufacture dental molded bodies/reconstructions through material-removing working. The dental restorations can be in the form of dental frameworks, crowns, partial crowns, bridges, caps, veneers, abutments, pin constructions, inlays and/or onlays or dental arches, but this is by no means an exhaustive list. A plurality of corresponding molded bodies may be obtained, depending on the diameter of the blanks.

Previously known blanks exhibit a uniform thickness across the regions from which the molded bodies are obtained through machining. A disadvantage here is that there are relatively high material losses since the material between the individual molded bodies is not utilized. A further particular disadvantage here is that the milling tool rotating about an axis of rotation and moving in the direction of the axis of rotation at least at the start of the processing of a molded part removes material from the blank with only a small part of the tool surface so that there is a high load on the tool. The wear is consequently relatively high.

All of these disadvantages are avoided with the blanks according to the invention.

Figure 1:
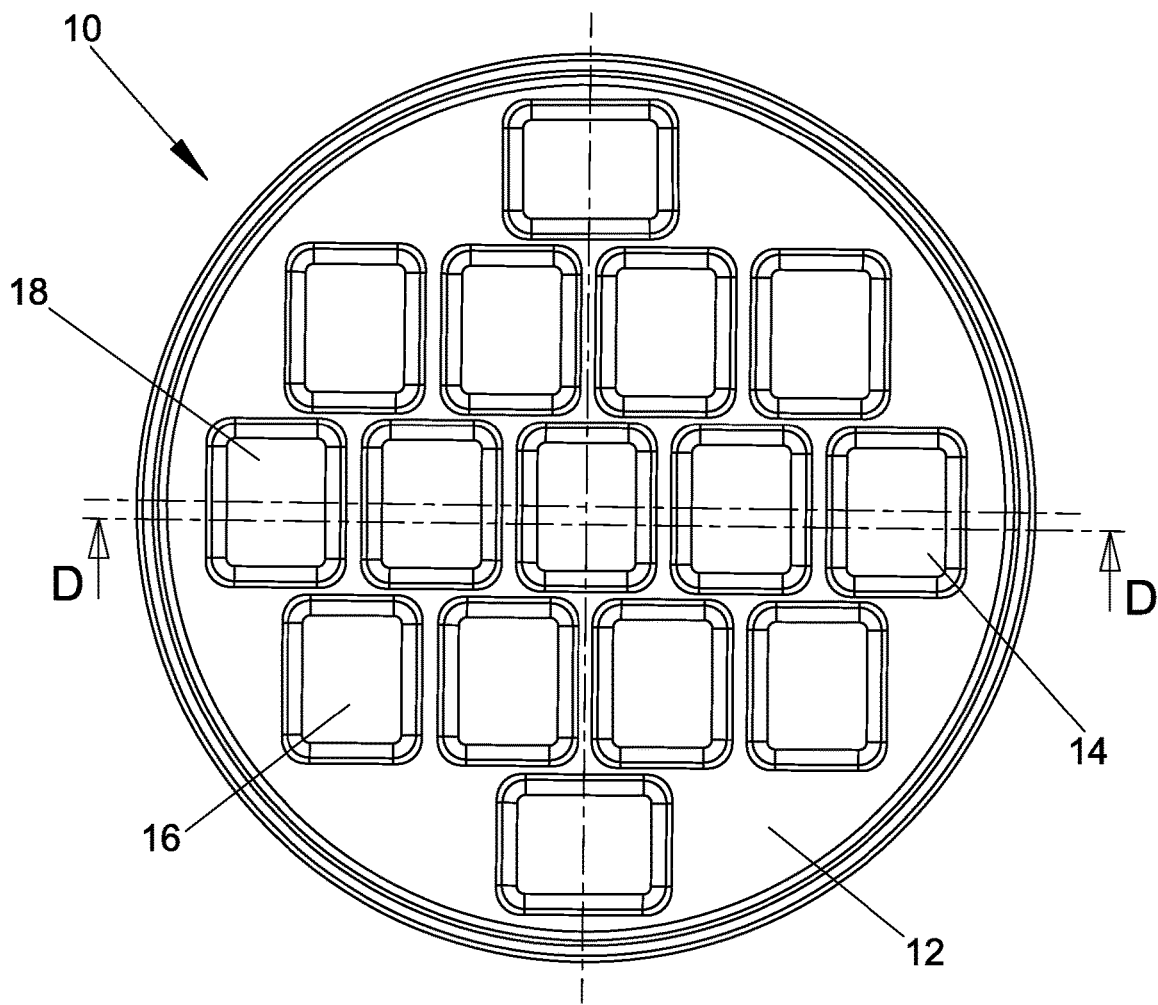
FIG. 1 A top view of a first embodiment of a blank,
FIG. 2 A section along the line D-D in FIG. 1,
FIG. 3 The blank according to FIG. 1 viewed from the bottom,
FIG. 4 A top view of a second embodiment of a blank,
FIG. 5 A section along the line A-A in FIG. 4,
FIG. 6 The blank according to FIG. 4 viewed from the bottom,
FIG. 7 A further embodiment of a blank, and
FIG. 8 A section along the line A-A in FIG. 7.
Figure 2:
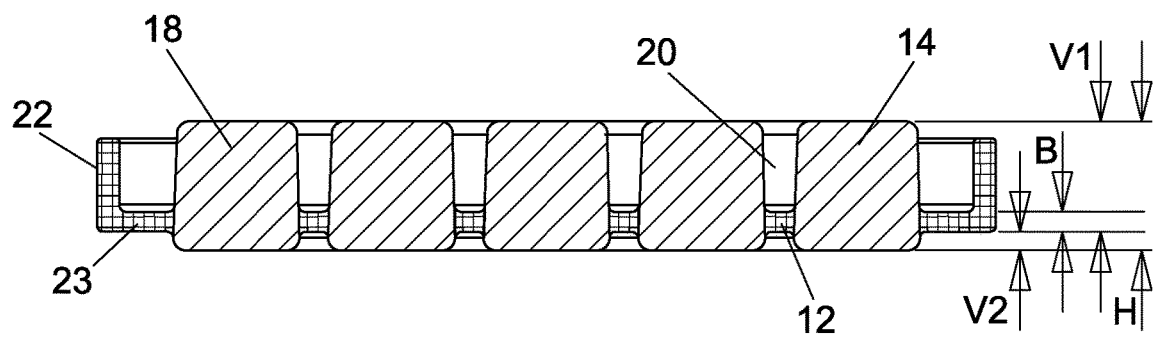
Figure 3:
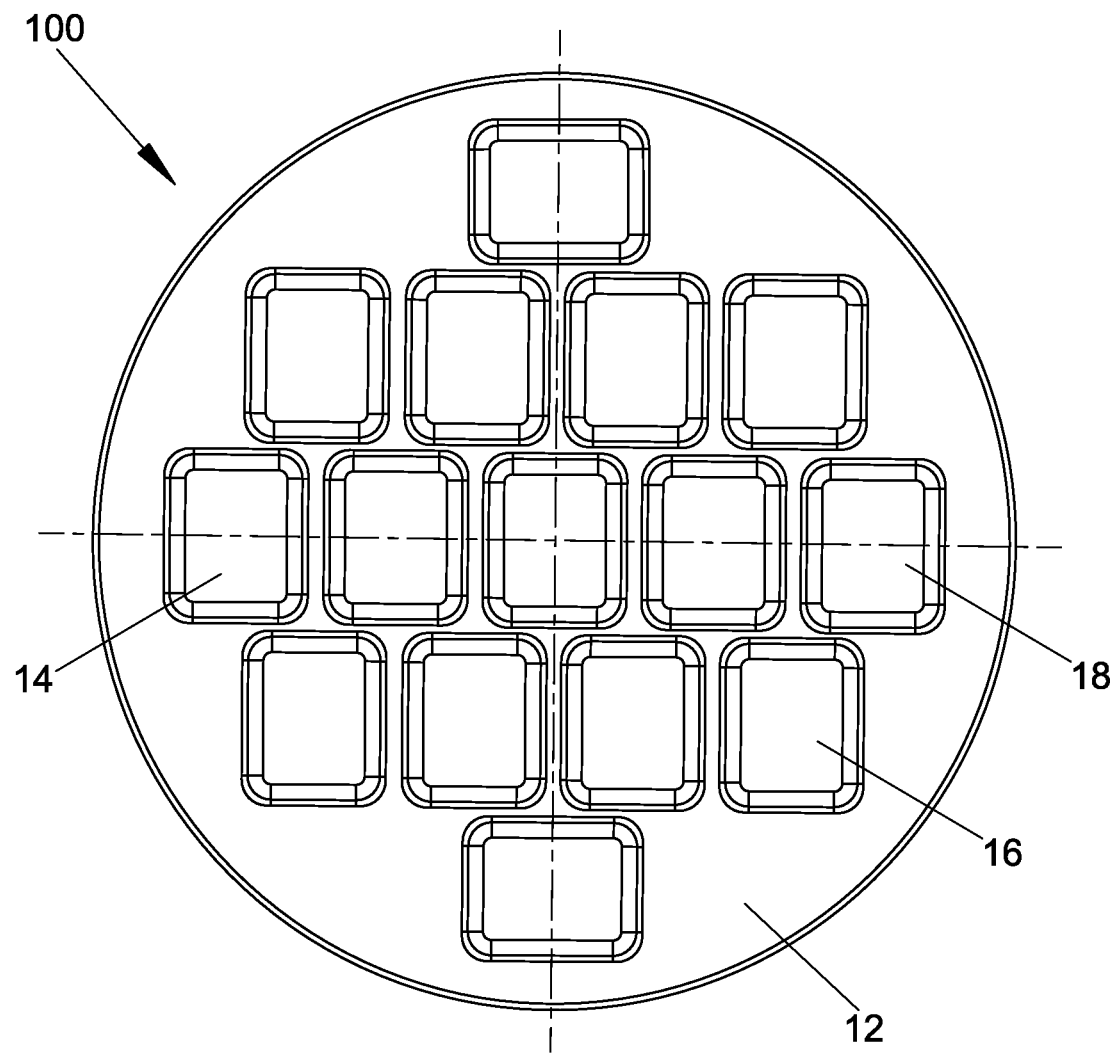

FIGS. 1 to 3 thus show a first embodiment of a disc-shaped blank 10 that in the diagrams has a circular geometry, which has regions of different thickness.

Thus the blank 10 in principle comprises a base 12 and regions that emanate therefrom, indicated by way of example by the reference numbers 14, 16 and 18. In the exemplary embodiment the regions 14, 16, 18 do not just project above one side of the base 12, but rather extend on both sides, as clearly shown in the sectional view in FIG. 2. This, however, is not a required characteristic. Rather, the invention relates also to a blank wherein regions project only from one side of the base.

The height of the regions 14, 16, 18 is aligned with the molded bodies to be produced.

To obtain desired molded bodies from the regions 14, 16, 18, it is possible due to the space between the regions 14, 16, 18 that a machining tool acts from the side on the elevated regions 14, 16, 18, i.e., a relative movement to the elevation 14, 16, 18 substantially perpendicular to the axis of rotation of the tool is achieved. This possibility relates not just to the regions 14, 16, 18, that are arranged in the perimeter of the blank 10, but also to the regions surrounded by a plurality of projecting regions, as there is a distance between these, as can be seen in the sectional view of FIG. 2. A corresponding distance is indicated by way of example by the reference number 20.

In particular the invention provides for the elevated regions 14, 16, 18 emanating from the base to extend non-symmetrically on both sides of the base, so that without change to holders, that normally accommodate blanks with the usual milling machines, blanks according to the invention can be fixed in a processing machine. For this purpose a circumferential border 22 is provided in the exemplary embodiment which limits the blank 10 peripherally. In this example the edge 22 has an L-shaped cross-section and may be an integral part of the blank 10. The edge 22 can of course also be a separately-produced element that is connected to the blank, i.e., in particular with the base 12, for instance through gluing.

As can be seen from the sectional view in FIG. 2, the base 12 has a thickness B that is preferred in the range 1 to 10 mm, in particular between 1 mm and 5 mm, and especially preferred in the range 1.5 mm to 3 mm. The region 14, 16, 18 projecting above the upper side of the base 12 has a thickness V1 and the region projecting from the underside of the base 12 has a thickness V2. V1+V2+B should preferably lie between 15 mm and 25 mm. In particular the ratio of the thickness B of the base 12 to the total thickness H (=V1+V2+B) of the particular region 14, 16, 18 should be 1:15 to 1:1, in particular 1:10≤B:H≤1:6.

From the bottom view of the blank 10 it is similarly clear that the regions 14, 16, 18 project above the base 12.

Figure 4:
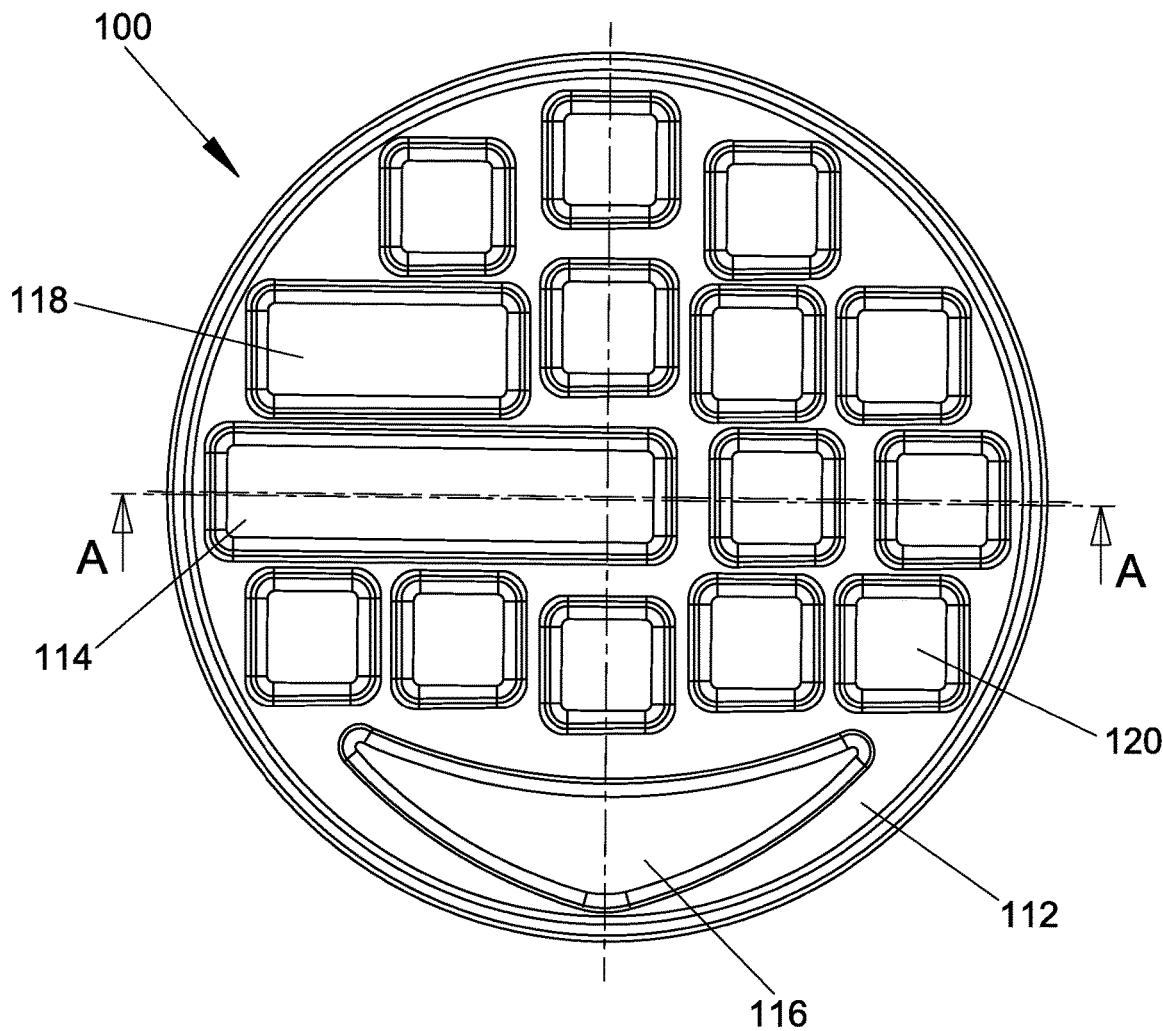
Figure 5:
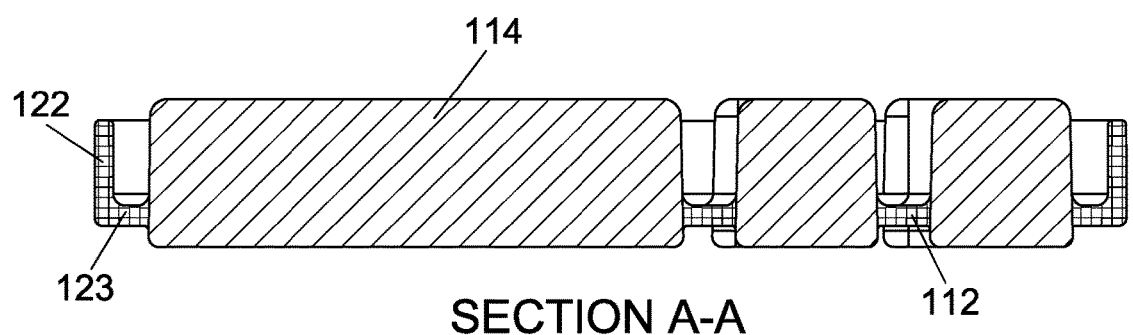
Figure 6:
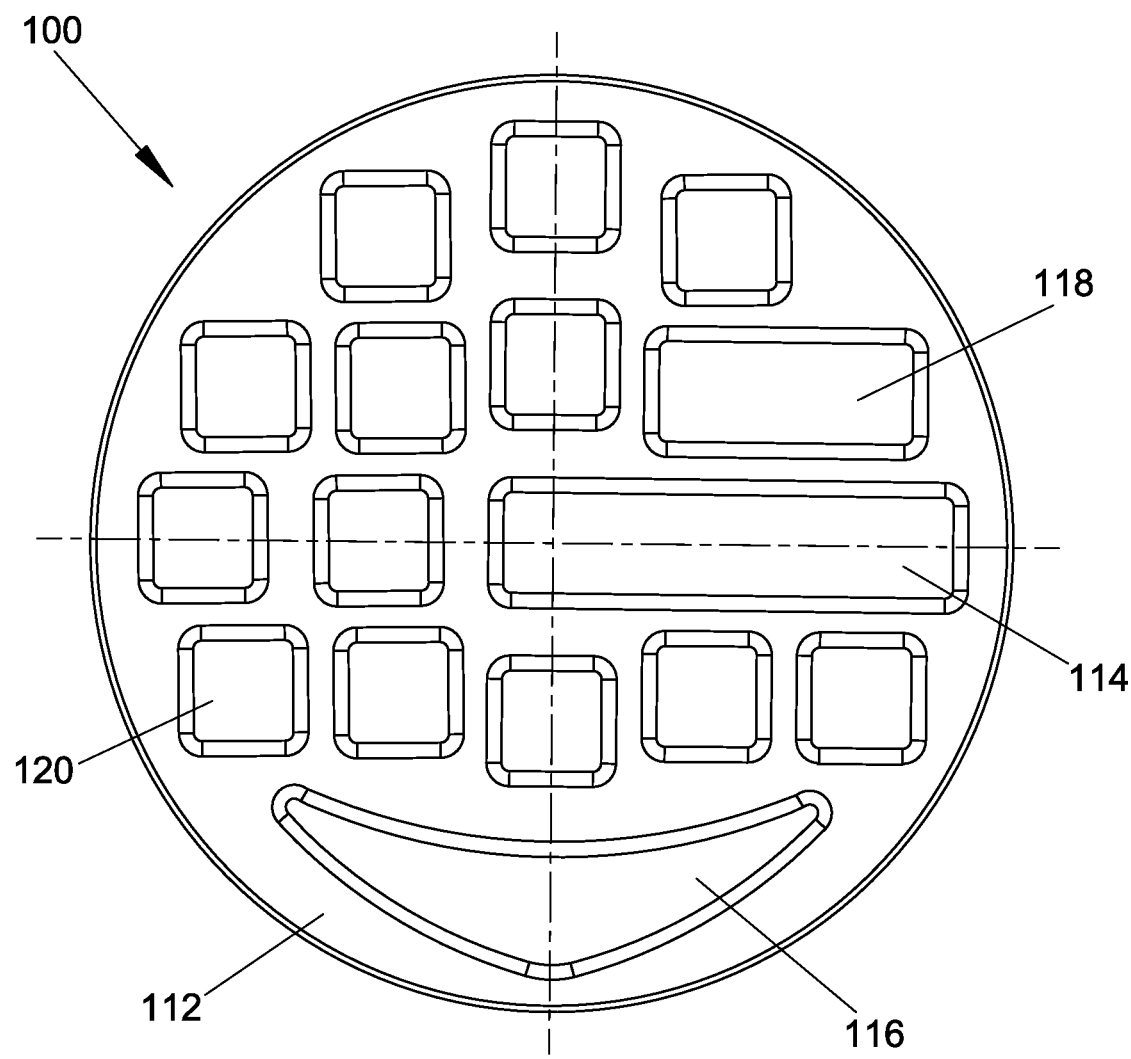

The exemplary embodiment shown in FIGS. 4 to 6 differs from that in FIGS. 1 to 3 in that the blank 100, which also has a circular geometry, has regions that extend differently in terms of area. By way of example, four regions 114, 116, 118 and 120 are indicated. The regions 114, 116, 118, 120 extend—as with the embodiment illustrated by FIGS. 1 to 3—on both sides of a base 112, as can be seen in the sectional view A-A (FIG. 5). The blank 100 and thus the base 112 are also delimited by a circumferential edge 122. The description for FIGS. 1 to 3 applies here too.

Since regions of different area extend from the base 112, it follows that molded bodies of different geometries and sizes can be obtained. For example, a four to five unit bridge can be machined from the region 114, a front dental arch from the region 116, a three unit bridge from the region 118 and from the other equally dimensioned regions 120 single tooth restorations such as inlays, onlays, crowns etc. can be machined.

The same advantages, as described above, are also seen for the blank 100, in particular the material savings and the lower wear of the rotating tool, since the projecting regions

114, 116, 118, 120 can be approached from the side, i.e., transversely or perpendicularly to the axis of rotation.

The teaching according to the invention enables material to be spared. This saving may be up to 40% if, for example, the base 12, 112 has a thickness of 2 mm and the total thickness of the blank, in the regions from which the projections 14, 16, 18, 114, 116, 118, 120 emanate from the base 12, 112, is 18 mm.

As mentioned already, the blanks 10, 100 according to the invention, as well as blanks of uniform thickness, can be held in the usual holders since it is not necessary to change the profile and the dimensions of the edge 22, 122. Thereby, the limb 23, 123 of the edge 22, 122, which extends parallel to the plane defined by the blank 10, 100 and which in the sectional views extends horizontally, is an extension of the base 12, 112, as can be seen in the sectional views.

The blanks 10, 100 can be produced, for example, through additive methods by pressing, casting, forming or mechanical manufacturing methods.

It is also possible for the material of the blank at least in the region of the elevations 14, 16, 18, 114, 116, 118, 120 in particular over its height to have a different composition/different material characteristics to, for instance, obtain a color gradation that corresponds to that of natural teeth for the crowns or bridges. produced.

It is also possible to make regions comprising different material layers so that a dentine core is formed. Different translucency, strength and/or fluorescence can be generated over the height of the particular region 14, 16, 18, 114, 116, 118, 120 depending on the materials.

Figure 7:
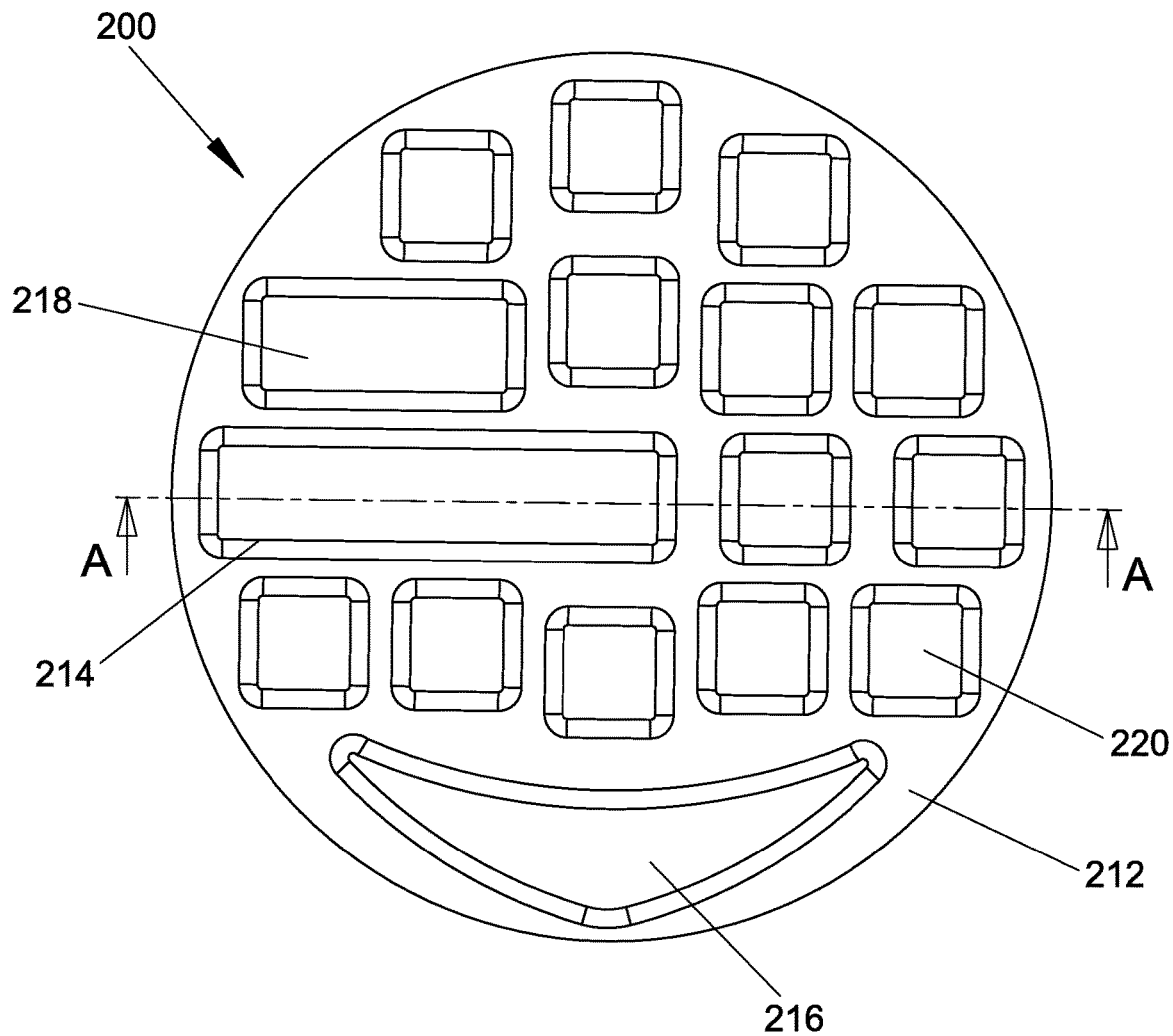
Figure 8:
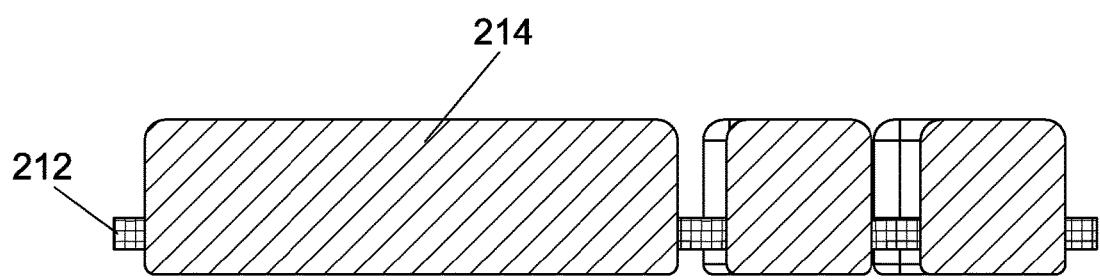

The exemplary embodiment according to FIGS. 7 and 8 differs from that of FIGS. 1 to 6 in that the elevated regions to be worked 214, 216, 218, 220 emanate from a base 212 that is made from a material different from that of the regions 214, 216, 218, 220. The base 212 virtually forms a carrier that has recesses in which the elevated regions to be worked 214, 216, 218, 220 are fixed, for instance through gluing. It is also possible for the base to be produced through injection molding, wherein the elevated regions 214, 216, 218, 220 are surrounded by a base material layer corresponding to the thickness of the base 212. Plastics in particular are suitable materials for the base 112, i.e., the carrier.

The invention claimed is:

1. A blank for the production of a molded body, the blank comprising:
    A carrier base having an upper side surface and an underside surface being separated by a thickness B, therebetween, and
    a plurality of regions projecting from either the upper side surface of the carrier base, the underside surface of the carrier base, or both the upper side surface and the underside surface of the carrier base;
    wherein the carrier base is of a material different than that of the plurality of regions;
    wherein at least two regions of the plurality of regions project from the carrier base by a thickness V1 to form a valley at least partially defined by empty space between opposing side surfaces of the at least two regions of the plurality of regions and the upper side surface of the carrier base extending therebetween;
    wherein the thickness B of the carrier base extending between the at least two regions is less than the thickness V1 of the at least two regions and wherein the blank has not previously been milled, and,
    wherein the carrier base is adapted to fit in a milling machine by including a limb as part of the carrier base that extends parallel to a plane defined by the blank and that is connected to an upstanding edge of the carrier base that limits the blank peripherally.

2. The blank according to claim 1, wherein the carrier base has a disc-shaped geometry over which the plurality of regions project therefrom.

3. The blank according to claim 1, wherein the carrier base further includes a circumferential edge projecting from at least a portion of a perimeter of the carrier base, the circumferential edge being fixedly secured to the carrier base or removably secured to the carrier base.

4. The blank according to claim 1, wherein the at least two regions of the plurality of regions have a geometry selected from the group consisting of cuboid, cylindrical, conical and curve shape.

5. The blank according to claim 1, wherein the thickness B of the carrier base is $\leq 10$ mm.

6. The blank according to claim 1, wherein the at least two regions of the plurality of regions have different geometries projecting above the carrier base.

7. The blank according to claim 6, wherein one or more of a dental framework, a crown, a partial crown, a bridge, a dental arch, a cap, a veneer, an abutment, a pin construction, an inlay and/or an onlay is manufactured from the at least two regions of the plurality of regions.

8. The blank according to claim 1, wherein the blank and/or the at least two regions of the plurality of regions includes a material selected from the group consisting of ceramic material, metallic material, an organic material, and a glass fiber-reinforced plastic.

9. The blank according to claim 8, wherein the ceramic material is selected from the group consisting of zirconium dioxide, glass ceramic, and feldspar ceramic, the metallic material is selected from the group consisting of titanium and CoCr alloy, and/or the organic material is a thermoplastic material.

10. The blank according to claim 1, wherein the carrier base and at least one of the at least two regions include sections of different ceramic material compositions.

11. The blank according to claim 1, wherein the carrier base and at least one of the two regions include sections of different material characteristics selected from the group consisting of strength, translucency, color, and fluorescence.

12. The blank according to claim 1, wherein the thickness B is 1.5 mm$\leq$B$\leq$4 mm.

13. The blank according to claim 1, further comprising at least two regions of the plurality of regions projects from the underside of the carrier base to define a thickness V2.

14. The blank according to claim 13, wherein a total thickness H of the carrier base is the sum of the thickness B plus the thickness V1 plus the thickness V2, wherein a ratio of the thickness B of the carrier base to the total height H of the at least one of the plurality of regions projecting above the carrier base is $1:15 \leq B:H \leq 1:1$.

15. The blank according to claim 14, wherein a ratio of thickness B of the carrier base to the total thickness H of the at least one of the plurality of regions projecting above the carrier base is $1:10 \leq B:H \leq 1:6$.

16. The blank according to claim 1, wherein at least a part of the molded body is derived from the at least one of the plurality of regions by mechanical working.

17. The blank according to claim 1, wherein the carrier base is of a first ceramic material that is different from a second ceramic material of at least one of the plurality of regions.

18. The blank according to claim 1, wherein at least a part of the molded body is derived from the at least one of the plurality of regions by mechanical working and wherein the carrier base is of a first ceramic material that is different from a second ceramic material of at least one of the plurality of regions.

19. The blank according to claim 1, wherein the plurality of regions are attached to the carrier base in one or more openings in the carrier base by an adhesive.

20. A method for the manufacture of at least one molded body that is a dental restoration, or part thereof, comprising the steps of:
  providing a blank that has not previously been milled that includes a carrier base and a plurality of regions projecting from the carrier base, wherein a first region and a second region of the plurality of regions project from an upper side surface of the carrier base, an underside surface of the carrier base, or both by a first side wall and second side wall respectively to form a valley at least partially defined by empty space therebetween, the first region and the second region being spaced apart by an area defined by the first side wall, the second side wall and a portion of the carrier base therebetween, wherein the portion of the carrier base extending between the first region and the second region has a thickness B, wherein the carrier base is of a first ceramic material that is different from a second ceramic material of at least one of the plurality of regions and wherein the carrier base is adapted to fit in a milling machine by including a limb as part of the carrier base that extends parallel to a plane defined by the blank and that is connected to an upstanding edge of the carrier base that limits the blank peripherally;
  placing the carrier base in a milling machine;
  locating a rotating tool in the spaced apart area between the first region and the second region of the plurality of regions;
  contacting the rotating tool with the first side wall of the first region;
  machining by material-removing of a portion of the first region of plurality of regions, wherein the machining removes material circumferentially about a surface of the first side wall of the first region.

21. The method according to claim 20, further comprising the step of manufacturing the blank through pressing, casting, additive processes, and/or forming methods.

* * * * *